(12) United States Patent
Pawar et al.

(10) Patent No.: US 12,039,511 B2
(45) Date of Patent: Jul. 16, 2024

(54) METHODS, POINT-OF-SALE TERMINALS, AND COMPUTER PROGRAM PRODUCTS FOR AUDIO PLAYBACK AT POINT-OF-SALE TERMINALS

(71) Applicant: MASTERCARD INTERNATIONAL INCORPORATED, Purchase, NY (US)

(72) Inventors: Kaveri Pawar, Pune (IN); Divya S, Kannur (IN); Praveen Teragankar, Dharwad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 233 days.

(21) Appl. No.: 17/190,874

(22) Filed: Mar. 3, 2021

(65) Prior Publication Data
US 2021/0279707 A1    Sep. 9, 2021

(30) Foreign Application Priority Data
Mar. 4, 2020  (IN) .............................. 202011009252

(51) Int. Cl.
*G06Q 20/20* (2012.01)
*G06Q 20/34* (2012.01)

(52) U.S. Cl.
CPC ......... *G06Q 20/209* (2013.01); *G06Q 20/204* (2013.01); *G06Q 20/34* (2013.01)

(58) Field of Classification Search
CPC ..... G06Q 20/209; G06Q 20/204; G06Q 20/34
See application file for complete search history.

(56) References Cited

U.S. PATENT DOCUMENTS

| | | | |
|---|---|---|---|
| 10,026,077 B2* | 7/2018 | Hosny | G06K 19/07 |
| 11,397,939 B2* | 7/2022 | Hafemann | G06Q 20/3278 |
| 2015/0053771 A1* | 2/2015 | Juetten | G06K 19/07732 235/492 |
| 2017/0004485 A1* | 1/2017 | Lee | G06Q 20/3226 |
| 2021/0209566 A1* | 7/2021 | Ketharaju | G06Q 20/405 |

* cited by examiner

*Primary Examiner* — A. Hunter Wilder
*Assistant Examiner* — Joseph M Mutschler
(74) *Attorney, Agent, or Firm* — Barta Jones, PLLC

(57) ABSTRACT

The invention provides methods, point-of-sale (POS) terminals, and computer program products for delivering feedback through a POS terminal during a payment transaction involving a payment card. The invention comprises (i) detecting at the POS terminal an interface event comprising the payment card communicatively interfacing with the POS terminal, (ii) detecting at the POS terminal, a payment application stored within a memory of the payment card, (iii) identifying an audio file associated with the detected payment application, and (iv) initiating playback of the identified audio file through an audio playback device controlled by the POS terminal, wherein playback of the audio file is implemented between a playback commencement event detected by the POS terminal and a playback termination event detected by the POS terminal.

18 Claims, 8 Drawing Sheets

METHODS, POINT-OF-SALE TERMINALS, AND COMPUTER PROGRAM PRODUCTS FOR AUDIO PLAYBACK AT POINT-OF-SALE TERMINALS

CROSS REFERENCE TO RELATED APPLICATION

This application claims priority to Indian Application No. 202011009252, filed Mar. 4, 2020, entitled "METHODS, POINT-OF-SALE TERMINALS, AND COMPUTER PROGRAM PRODUCTS FOR AUDIO PLAYBACK AT POINT-OF-SALE TERMINALS", the entirety of which is incorporated herein.

FIELD OF THE INVENTION

The present invention relates to the domain of payment card transactions, and more particularly to methods, point-of-sale (POS) terminals, and computer program products for playback of audio files at POS terminals, including for generating brand awareness, or for reinforcing a brand identity, associated with a payment card.

BACKGROUND OF THE INVENTION

With growing acceptance of payment cards (e.g., credit cards and debit cards) as instruments for effecting electronic payment transactions, there have been corresponding advances in technologies for enabling payment cards to interface with point-of-sale (POS) terminals during transaction execution.

Initially, the default interface capability for payment cards consisted of a magnetic stripe that stored payment card information, and which required to be swiped through a magnetic card reader integrated into or coupled with a POS terminal, to enable the POS terminal to read payment card information. Subsequently, payment cards have additionally incorporated a microprocessor chip or smartchip that is configured to interact with a POS terminal when the contacts of the smartchip are physically interfaced with a smartchip reader that is integrated into or coupled with a POS terminal. The microprocessor chip or smartchip enables the POS terminal to read payment card information stored within the smartchip or on a memory within the payment card. Recently, payment cards also incorporate a radio frequency antenna or a contactless communication chip, which, respond to detection of electromagnetic waves of an appropriate radio frequency (for example, electromagnetic waves generated by a POS terminal) by contactlessly transmitting payment card information to the POS terminal.

Ordinarily, the process of effecting a payment through a payment card at a POS terminal involves between a few seconds to several minutes, depending on several factors—including the number of input selections that a payor/terminal operator is required to make, processing capabilities of the POS terminal, network availability, network bandwidth, responsiveness of other network entities involved in the payment transaction, etc. While certain POS terminals are configured to playback audio tones to alert a user to an input event or to transaction completion, such tones are typically played as event alerts—whereas for the remainder of the transaction period, the payor and/or terminal operator do not receive any audio feedback. The payor/terminal operator accordingly does not, during the transaction period, receive any feedback confirming whether the transaction is ongoing, or has been completed—and as a result, the payor/terminal operator is required to maintain a visual check on the display of the POS terminal until the transaction is either terminated or finally completed.

There is accordingly a need for providing continuous feedback to a payor/terminal operator during implementation of the payment transaction, to improve the overall customer experience, and to relieve the payor/terminal operator from having to continuously maintain a visual check on the display of the POS terminal. Additionally, there is a previously unrecognized opportunity to utilize the period of time during the transaction implementation more efficiently, to deliver meaningful information to the payor/operator, including information that creates brand awareness or reinforces the brand identity of one or more entities associated with the payment transaction.

BRIEF DESCRIPTION OF THE ACCOMPANYING DRAWINGS

SUMMARY

Figure 1:
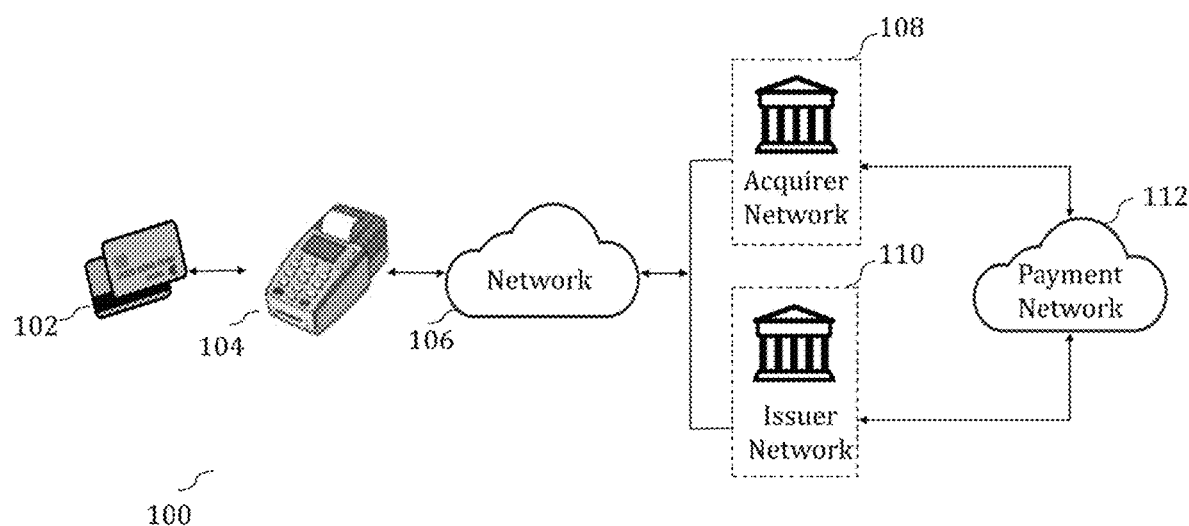
FIG. 1 illustrates a system environment for implementing a POS terminal-based payment transaction.

The present invention relates to the domain of payment card transactions, and more particularly to methods, POS terminals, and computer program products for playback of audio files at POS terminals, including for generating brand awareness, or for reinforcing a brand identity associated with a payment card.

The invention provides a method for delivering feedback through a point-of-sale (POS) terminal during a payment transaction involving a payment card. The method comprises the steps of (i) detecting at the POS terminal an interface event comprising the payment card communicatively interfacing with the POS terminal, (ii) detecting at the POS terminal, a payment application stored within a memory of the payment card, (iii) identifying an audio file associated with the detected payment application, and (iv) initiating playback of the identified audio file through an audio playback device controlled by the POS terminal, wherein playback of the audio file is implemented between a playback commencement event detected by the POS terminal and a playback termination event detected by the POS terminal.

In a method embodiment, the interface event is triggered by any of (i) contacting a smartchip reader integrated within or coupled with the POS terminal, with a smartchip integrated within the payment card, and (ii) proximity induced contactless communication between a contactless chip within the payment card and a contactless transceiver integrated within the POS terminal.

In another method embodiment, the detected payment application may comprise any software application, software data file or data record that stores one or more of (i) a payment account number corresponding to the payment card, (ii) one or more security keys associated with the payment card, or with a corresponding payment card account, or with a corresponding payment network, or a corresponding issuer institution, (iii) a payment network identifier, and (iv) an issuer institution identifier.

In a particular embodiment of the method, detecting the payment application includes any one or more of (i) extracting information from the payment application, and (ii) identifying any of a payment account number, payment network, or a payment network institution, or an issuer network or issuer institution associated with the payment application.

In a specific embodiment of the method, (i) the payment card includes a plurality of payment applications stored within a memory therewithin, and (ii) detecting the payment application comprises (a) detecting the plurality of payment applications stored within the payment card memory, (b) selecting one of the plurality of payment applications, and (c) extracting information from the selected payment application.

In a particular embodiment, selecting one of the plurality of payment applications is based on user input received through the POS terminal.

In one method embodiment, the audio file is identified based on audio file information stored within either of the payment application or the POS terminal, and which audio file information associates the audio file and the payment application. The audio file may be associated with a payment network institution or with an issuer institution corresponding to the payment application.

In a further embodiment of the method, the audio file comprises an audio theme, a song, musical composition, audio composition, or audio jingle associated with the payment network institution or the issuer institution.

In a particular method embodiment, the playback commencement event may comprise (i) identification or detection of the payment application by the POS terminal, or (ii) selection of the payment application from among a plurality of payment applications that are stored within the memory of the payment card, and each of which are recognized or supported by the POS terminal.

In another method embodiment, the playback termination event may comprise (i) detection by the POS terminal, of a communication channel failure between the POS terminal and any entity involved in the payment transaction; or (ii) receiving at the POS terminal, an outcome decision corresponding to the payment transaction.

The invention additionally provides a point-of-sale (POS) terminal configured for delivering feedback during a payment transaction involving a payment card. The POS terminal may comprise at least one processor configured for (i) detecting at the POS terminal an interface event comprising the payment card communicatively interfacing with the POS terminal, (ii) detecting at the POS terminal, a payment application stored within a memory of the payment card, (iii) identifying an audio file associated with the detected payment application, and (iv) initiating playback of the identified audio file through an audio playback device controlled by the POS terminal, wherein playback of the audio file is implemented between a playback commencement event detected by the POS terminal and a playback termination event detected by the POS terminal.

The POS terminal may be configured such that the interface event is triggered by any of (i) contacting a smartchip reader integrated within or coupled with the POS terminal, with a smartchip integrated within the payment card, and (ii) proximity induced contactless communication between a contactless chip within the payment card and a contactless transceiver integrated within the POS terminal.

The POS terminal may further be configured such that the detected payment application comprises any software application, software data file or data record that stores one or more of (i) a payment account number corresponding to the payment card, (ii) one or more security keys associated with the payment card, or with a corresponding payment card account, or with a corresponding payment network, or a corresponding issuer institution, (iii) a payment network identifier, and (iv) an issuer institution identifier.

In an embodiment, the POS terminal may be configured such that detecting the payment application includes any one or more of (i) extracting information from the payment application, and (ii) identifying any of a payment account number, payment network, or a payment network institution, or an issuer network or issuer institution associated with the payment application.

In another embodiment, the POS terminal may be configured such that (i) the payment card includes a plurality of payment applications stored within a memory therewithin, and (ii) detecting the payment application comprises (i) detecting the plurality of payment applications stored within the payment card memory, (ii) selecting one of the plurality of payment applications, and (iii) extracting information from the selected payment application.

In a particular embodiment, the POS terminal may be configured such that selecting one of the plurality of payment applications is based on user input received through the POS terminal.

In a specific embodiment, the POS terminal may be configured such that the audio file is identified based on audio file information stored within either of the payment application or the POS terminal, and which audio file information associates the audio file and the payment application.

The POS terminal may be configured such that the audio file is associated with a payment network institution or with an issuer institution corresponding to the payment application. The POS terminal may further be configured such that the audio file comprises an audio theme, a song, musical composition, audio composition, or audio jingle associated with the payment network institution or the issuer institution.

The POS terminal is in certain embodiments configured such that the playback commencement event comprises (i) identification or detection of the payment application by the POS terminal, or (ii) selection of the payment application from among a plurality of payment applications that are stored within the memory of the payment card, and each of which are recognized or supported by the POS terminal.

In another embodiment, the POS terminal may be configured such that the playback termination event comprises (i) detection by the POS terminal, of a communication channel failure between the POS terminal and any entity involved in the payment transaction, or (ii) receiving at the POS terminal, an outcome decision corresponding to the payment transaction.

The invention also provides a computer program product for delivering feedback through a point-of-sale (POS) terminal during a payment transaction involving a payment card, comprising a non-transitory computer usable medium having a computer readable program code embodied therein. The computer readable program code comprises instructions for (i) detecting at the POS terminal an interface event comprising the payment card communicatively interfacing with the POS terminal, (ii) detecting at the POS terminal, a payment application stored within a memory of the payment card, (iii) identifying an audio file associated with the detected payment application, and (iv) initiating playback of the identified audio file through an audio playback device controlled by the POS terminal, wherein playback of the audio file is implemented between a playback commencement event detected by the POS terminal and a playback termination event detected by the POS terminal.

DETAILED DESCRIPTION

For the purposes of the present invention, the following terms shall be understood to have the corresponding meanings provided below.

"Acquirer" shall mean a business (e.g., a financial institution or a merchant bank) that contracts with a merchant or payee to coordinate with an issuer of a payor's payment card or payment account.

"Acquirer network" shall refer to one or more servers, including hardware, software and other equipment used by an acquirer to transmit and process payment card-based transactions or payment account-based transactions and information related to merchants, customers, payment cards, payment accounts and/or transactions.

"Audio" shall refer to any sound including music, speech, and/or a special sound effect generated either synthetically (for example by an electronic instrument or a computing device) or non-synthetically (for example, by a musical instrument or a human).

"Issuer" shall mean a financial institution that issues payment cards or payment accounts to users.

"Issuer network" shall refer to one or more servers, including hardware, software and other equipment used by an issuer to transmit and process payment card transactions or payment account transactions and information related to customers, payment cards, payment accounts and/or transactions.

"Payee" and "Merchant" may be used interchangeably to designate an individual or entity receiving an electronic payment.

"Payment account" shall mean any account that may be used for the purposes of effecting an electronic payment or electronic transaction, and shall include any electronic transaction account, payment card account, bank account or electronic wallet account.

"Payment application" shall mean any software application or software data file or data record that is stored within a memory in a payment card, and which stores one or more of (i) a payment account number corresponding to the payment card, (ii) one or more security keys associated with the payment card, or with a corresponding payment card account, or with a corresponding payment network, and/or a corresponding issuer institution, (iii) a payment network identifier, and/or (iv) an issuer institution identifier.

"Payment card" shall mean a card or data associated with a payment account that may be provided to a merchant or payee in order to enable a financial transaction via the associated payment account. Payment cards may include credit cards, debit cards, charge cards, stored-value cards, prepaid cards, fleet cards, virtual payment numbers, virtual card numbers, controlled payment numbers, etc.

"Payment network" shall refer to any intermediary network communicatively disposed between any two or more of the merchant server, acquirer bank server and issuer bank server. In certain embodiments, the payment network may comprise a card network that enables communication between the issuer bank and the acquirer bank (for example, Mastercard® or Visa®). In such embodiments, the card network primarily coordinates payment card transactions between acquirers and issuers, and additionally coordinates clearing and settlement services to transfer payments from issuers to merchants.

"Payor", "consumer" and "customer" may be used interchangeably to designate an individual or entity making an electronic payment.

The present invention provides methods, POS terminals, and computer program products for playback of audio or audio files at POS terminals. The invention enables provision of auditory feedback to a payor/operator during implementation of the payment transaction, to improve the overall customer experience, and to relieve the payor/operator from having to continuously maintain a visual check on a display of a POS terminal. Additionally, the invention optimizes utilization of the period of time involved in transaction implementation more efficiently, by delivering information to the payor/operator, including information that creates brand awareness or reinforces the brand identity of one or more entities associated with the payment transaction.

FIG. 1 illustrates a system environment 100 for implementing a POS terminal-based payment transaction—within which the present invention may be implemented. In system environment 100, payment card 102 interfaces with POS terminal 104, and a payment transaction is initiated based on payment card information retrieved by POS terminal 104 from payment card 102 over a communication interface provided within payment card 102. As discussed briefly above, the communication interface within payment card 102 may comprise any of a magnetic stripe, a smartchip, and a contactless chip.

The payment card information retrieved by POS terminal 104 from payment card 102 may include at least a payment card number. POS terminal 104 transmits the payment card number, a payee account identifier, and a payment amount through network 106 to an acquirer network 108 (i.e., a data network maintained by an acquirer institution with which the payee account is maintained). Acquirer network 108 in turn transmits the payment instruction to issuer network 110 (i.e., a data network maintained by an issuer institution which has issued payment card 102 to the corresponding payor) through payment network 112 (i.e., a data network maintained by an intermediary between the payee's acquirer and the payor's issuer—for example, Mastercard® or Visa®). Subject to successful authorization of the payment card, the requested payment is authorized, and the payment amount is transferred from a payment account associated with payment card 102 to the payee account. Confirmation of successful transaction completion may thereafter be transmitted back to POS terminal 104.

Figure 2:
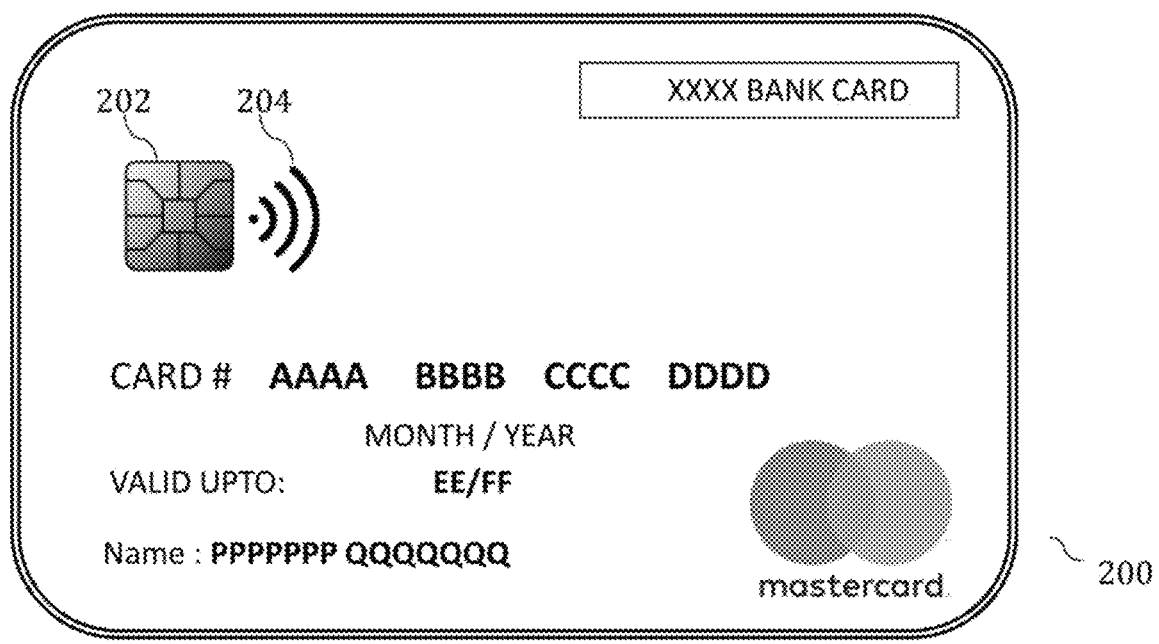
FIG. 2 illustrates a front view of an exemplary payment card.
Figure 3:
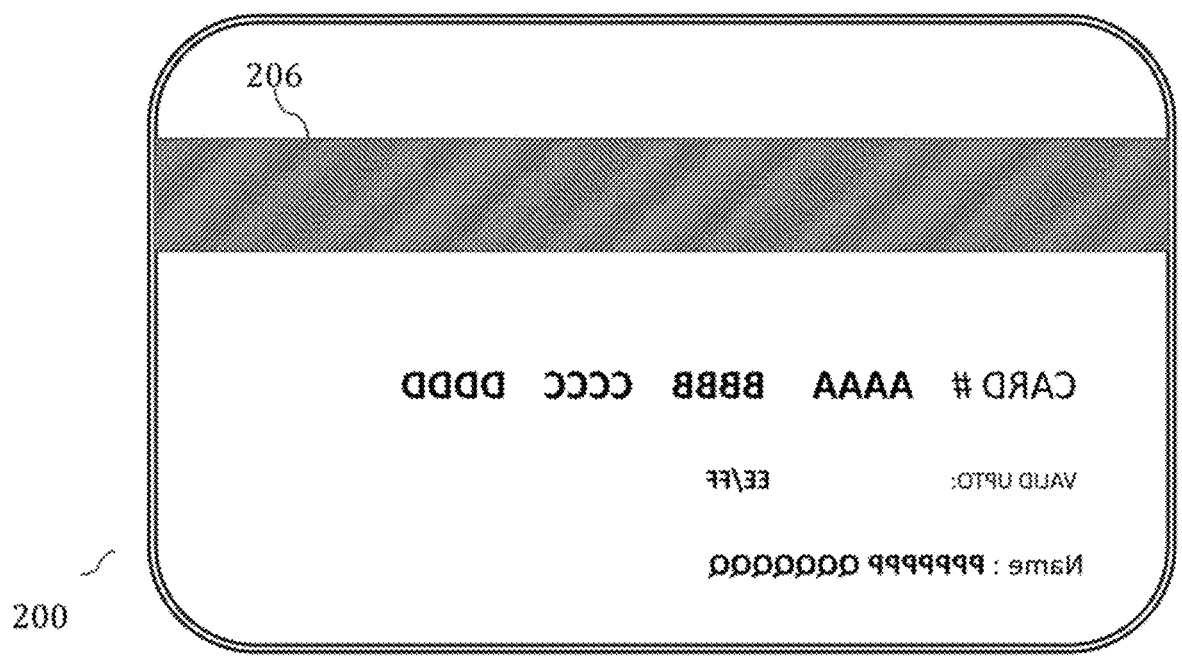
FIG. 3 illustrates a back view of an exemplary payment card.

FIGS. 2 and 3 respectively illustrate front and rear views of a payment card 200 of a type discussed for the purposes of the present invention. Payment card 200 comprises a plastic substrate having card information printed thereon (for example, the card holder's name, validity period, issuer name, payment institution name and a card verification value or card verification code). Payment card 200 additionally includes (i) a microprocessor chip or smartchip 202 that is configured to encode and store all or part of the printed card information, along with additional information, and that is configured to interact with a point-of-sale (POS) terminal through a smartchip reader integrated into or coupled with a POS terminal, to enable the POS terminal to read payment card information stored within the smartchip, (ii) a contactless device or contactless chip 204 that is that is configured to interact with a point-of-sale (POS) terminal contactlessly and to transmit to a contactless signal receiver integrated into or coupled with a POS terminal, payment card information corresponding to the payment card, and (iii) a magnetic stripe 206 disposed on a surface of the substrate—which encodes and stores all or part of the printed card information, along with additional information, and which can be swiped through a magnetic card reader integrated into or coupled with a POS terminal, to enable the POS terminal to read payment card information stored on magnetic stripe 206.

In an embodiment of the present invention, payment card 200 requires at least one of a microprocessor chip or smartchip 202, or a contactless device or contactless chip 204 implemented therein.

Figure 4:
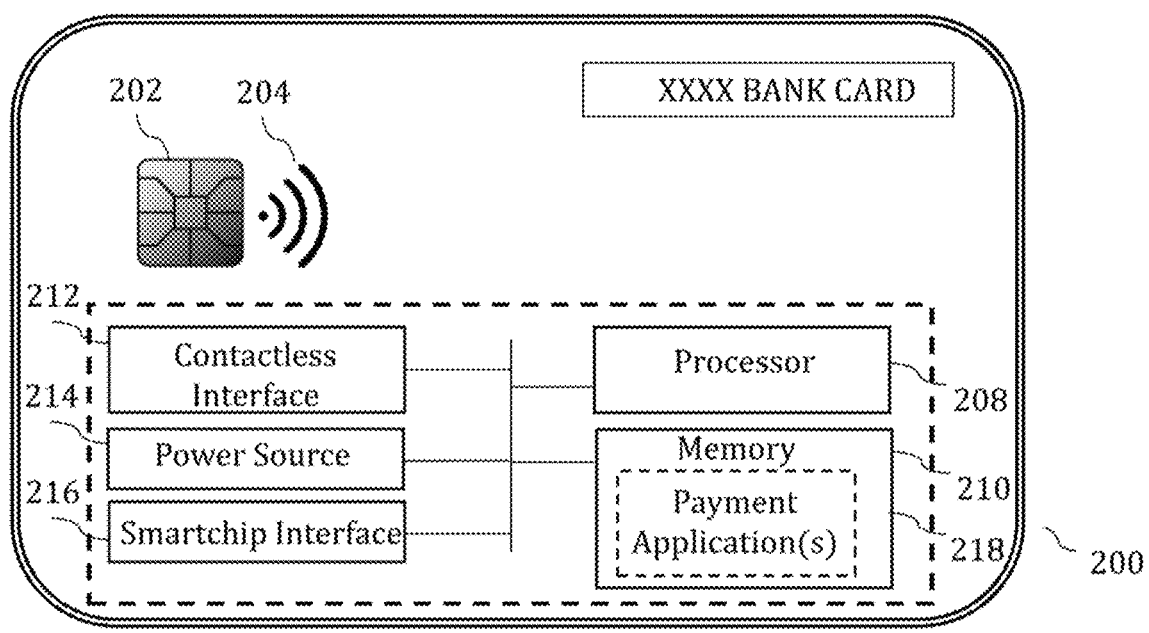
FIG. 4 illustrates internal components within an exemplary payment card.

FIG. 4 illustrates internal components of payment card 200—comprising processor 208, memory 210, contactless interface 212, an optional power source 214, and smartchip interface 216. Processor 208 comprises a processor component of smartchip 202. Memory 210 comprises a non-transitory or transitory memory configured to stored information corresponding to the payment card. In an embodiment of the invention, memory 210 has stored therewithin one or more payment applications 218—wherein each payment application comprises any of a software application, a software data file or a data record that is stored within memory 210 in payment card 200, and which stores one or more of (i) a payment account number corresponding to payment card 200, (ii) one or more security keys associated with payment card 200, a corresponding payment card account, a corresponding payment network, and/or a corresponding issuer institution, (iii) a payment network identifier corresponding to payment card 200, and/or (iv) an issuer institution identifier corresponding to payment card 200.

Contactless interface 212 is an interface component associated with contactless chip 204 and may be configured for enabling near field communication protocol-based data communication (or contactless data communication or contactless data communication based on any other wireless communication protocol or contactless communication protocol). In an embodiment, contactless interface 212 may comprise a contactless transmitter capable of communicating with one or more other devices having near field communication capabilities or contactless communication capabilities. Power source 214 may comprise an optional power source component for providing power to processor 208. Smartchip interface 216 comprises an interface component associated with smartchip 202 and may be configured for data transfer from payment card 200 to a chip reader or contactless signal reader integrated into or coupled with a POS terminal.

Figure 5:
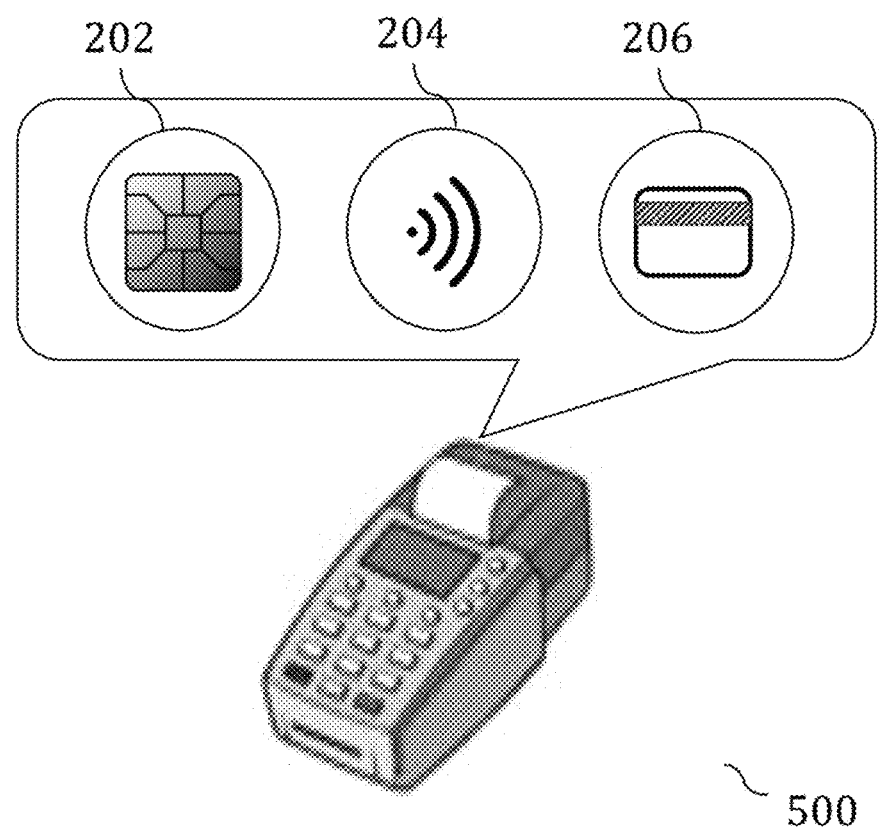
FIG. 5 illustrates an exemplary POS terminal configured to interface with payment cards through a plurality of payment card interfaces.

FIG. 5 illustrates an exemplary POS terminal 500 of a type discussed in the present invention, that is configured to interface with payment cards through any of a plurality of payment card interfaces. As shown in FIG. 5, POS terminal 500 may be configured to interact with payment cards through any of a payment card smartchip 202 (for example, through a smartchip reader integrated into or coupled with POS terminal 500), a payment card contactless chip 204 (for example, through a contactless transceiver integrated into or coupled with POS terminal 500), and a payment card magnetic stripe 206 (for example, through a magnetic stripe reader integrated into or coupled with POS terminal 500).

Figure 6:
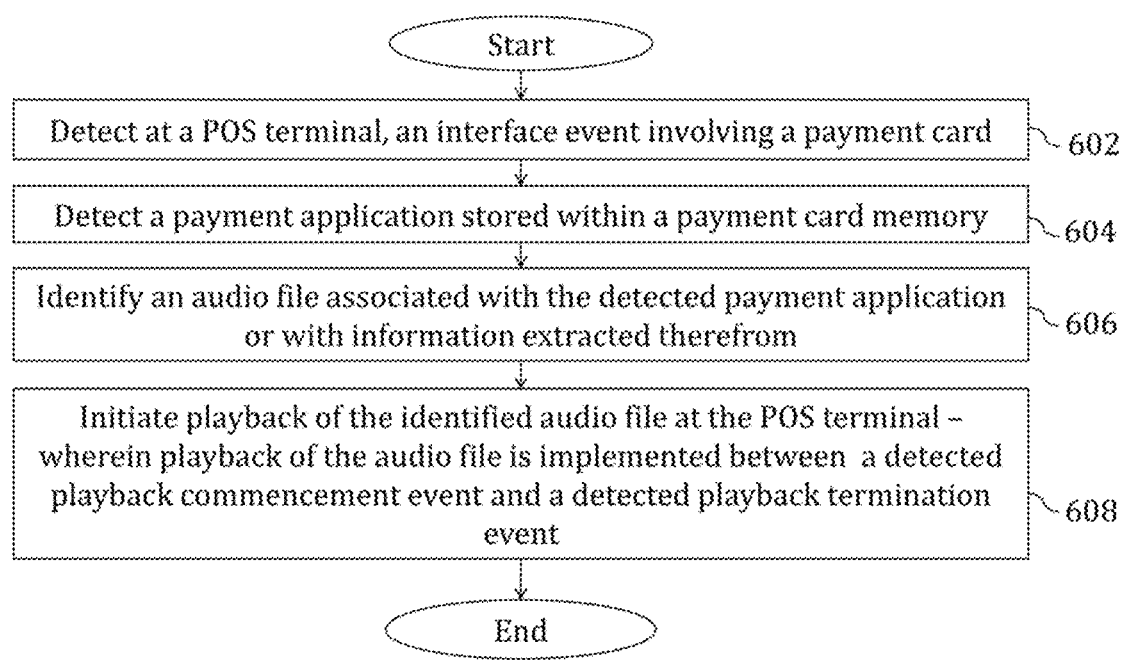
FIG. 6 illustrates a method of delivering audio feedback through a POS terminal during a payment transaction involving a payment card.

FIG. 6 illustrates a method of delivering audio feedback through a POS terminal during a payment transaction involving a payment card.

Step 602 comprises detecting at a POS terminal, an interface event involving a payment card i.e., an event comprising the payment card communicatively interfacing with the POS terminal. The interface event is detected in response to a payor or terminal operator initiating an interface between a payment card and the POS terminal. The interface event may in certain embodiments be triggered by any of, (i) bringing a smartchip that is integrated into the payment card into contact with a smartchip reader integrated into or coupled with the POS terminal, or (ii) bringing the payment card into sufficient proximity of the POS terminal to trigger communication between a contactless chip or RFID chip within the payment card and a contactless transceiver integrated within or coupled with the POS terminal.

Step 604 comprises detecting at the POS terminal, a payment application that is stored within a memory of the payment card that has interfaced with the POS terminal. Detecting the payment application may include the steps of extracting information from the payment application and identifying any of a payment account number, payment network, or a payment network institution, or an issuer network or issuer institution associated with the payment application.

In certain embodiments, where the payment card has a plurality of payment applications stored within a memory therewithin, step 604 may comprise detecting the plurality of payment applications stored within the payment card memory, selecting one of said payment applications, and extracting information from the selected payment application. In this embodiment, the selection of a payment application from among a plurality of payment applications, for the purposes of information extraction, may be based on user input identifying a specific payment application for information extraction. Alternately, selection may be based on identification of a payment application corresponding to a payment account or payment account number that a payor intends to use for implementing a payment transaction that has been initiated through the interface event detected at step 602.

In an embodiment of the invention, where the payment card is a smartchip payment card configured according to Europay-Mastercard-Visa (EMV) prescribed standards, detection of a payment application at step 604 may comprise parsing data stored in a payment system environment (PSE) maintained within a memory in the smartchip payment card. The PSE comprises a directory structure configured to hold records containing one or more payment applications that are stored within a payment card.

In an embodiment of the invention, where the payment card is a contactless payment enabled payment card (for e.g., an NFC or RFID enabled payment card) configured according to EMV prescribed standards, detection of a payment application at step 604 may comprise parsing data stored in the proximity payment system environment (PPSE) maintained within a memory in the smartchip payment card. The PPSE comprises a directory structure maintained within a memory of a contactless payment card—wherein the directory structure is configured to hold records containing one or more payment applications that are stored within a payment card.

Step 606 comprises identifying an audio file associated with the detected payment application, or with one or more information items extracted from the detected payment application—wherein the audio file includes sound information including music, speech, and/or a special sound effect generated either synthetically (for example by an electronic instrument or a computing device) or non-synthetically (for example, by a musical instrument or a human).

Identification of an audio file associated with the detected payment application may be either based on audio file information extracted from the payment application itself or may be based on audio file information that is pre-stored within the POS terminal—and which associates an audio file with the detected payment application. In an embodiment, the POS terminal may include at least one data record comprising a list of payment applications and corresponding audio files that are associated with each of such payment applications. In one embodiment, the identified audio file itself may be stored within a memory within the payment card and may be retrieved by the POS terminal from such memory. In another embodiment, a memory within the payment card may store a link, uniform resource locator (URL) or other address pointer, that identifies a location from which the identified audio file may be retrieved by the POS terminal. In another embodiment, the identified audio file may be stored within a memory within the POS terminal and may be retrieved by the POS terminal from such memory. In yet another embodiment, the identified audio file may be stored in a memory that is external to both the payment card and the POS terminal, and which is communicably coupled with the POS terminal—and may be retrieved by the POS terminal from such external memory.

In a preferred embodiment of the invention, the audio file associated with a payment application may comprise an audio file associated with a payment network institution or an issuer institution corresponding to such payment application. In a more preferred embodiment of the invention, the audio file associated with a payment application may comprise an audio theme, a song, musical composition, audio composition, or audio jingle that is associated with a payment network institution or an issuer institution corresponding to such payment application.

Step 608 comprises initiating playback of the identified audio file at the POS terminal—wherein playback of the audio file is implemented within a time period between a playback commencement event detected by the POS terminal and a playback termination event detected by the POS terminal.

The playback commencement event and the playback terminal event may be detected by the POS terminal based on event definitions stored within a memory in the POS terminal.

In various embodiments, any of the following events may comprise a playback commencement event for the purposes of step 608:
Where a POS terminal identifies only a single payment application that is stored within a memory of the payment card, and where the payment application is recognized or supported by the POS terminal, identification or detection of such payment application by the POS terminal may comprise the playback commencement event;
Where a POS terminal identifies a plurality of payment applications that are stored within a memory of the payment card, and where each of the identified payment applications which are recognized or supported by the POS terminal, receiving an instruction (for example, an instruction received by way of a user input at the POS terminal) for selecting one of the plurality of payment applications for payment transaction implementation may comprise the playback commencement event.

In various embodiments, any of the following events may comprise a playback termination event for the purposes of step 608:
detection of any communication channel failure between the POS terminal at one end, and any of the payment network, issuer network, or acquirer network, or any other entities involved in the payment transaction at the other end, may comprise a playback termination event;
receiving at a POS terminal, a final decision on an outcome of a requested payment transaction involving the payment card (e.g., any of an approve decision or a decline decision) at the POS terminal may comprise a playback termination event; and
in the event where a POS terminal has received a go-online decision, directing the POS terminal to await an issuer institution's response to a transaction authorization request, the POS terminal will wait for an issuer to respond to the transaction authorization request—and will inform a payor/terminal operator of the final result of the requested payment transaction (approved or declined) only after it receives the issuer's decision. In such event, either receipt of the issuer institution's decision at the POS terminal, or transmission of the results of the decision to the payor/terminal operator may comprise a playback termination event.

It will be understood that in cases where the playback duration of an audio file identified at step 606 is less than the time period between a playback commencement event and a playback termination event, the POS terminal may either loop the audio file so that it keeps playing until the playback termination event or may serially play a plurality of different audio files from detection of the playback commencement event up to detection of the playback termination event. In the event the playback duration of an audio file identified at step 606 is greater than the time period between a playback commencement event and a playback termination event, the POS terminal may either terminate playback of the audio file upon detection of the playback termination event or may continue playback of the audio file even beyond the playback termination event, up to completion of the full playback duration of the audio file.

It would be understood that by providing for audio playback from transaction commencement up to transaction termination, the method of FIG. 6 provides a payor/terminal operator with continuous auditory feedback concerning continuation of the payment transaction—thereby eliminating the need for the payor/terminal operator to maintain a visual check on the POS terminal. Additionally, in embodiments where audio playback involves playback of a brand theme song or an audio theme that specifically corresponds to the payment network or issuer institution or any other entity involved in the payment transaction, the invention enables utilization of the payment transaction duration to build or reinforce brand awareness corresponding to such entity. In other embodiments, where the audio file includes advertising information or other information, the invention enables delivery of valuable audio information to a payor during the payment transaction duration—and any of the payment network, issuer institution, or acquirer institution could potentially use this as an "advertising model" or "infomercial model" based revenue generation service.

Figure 7:
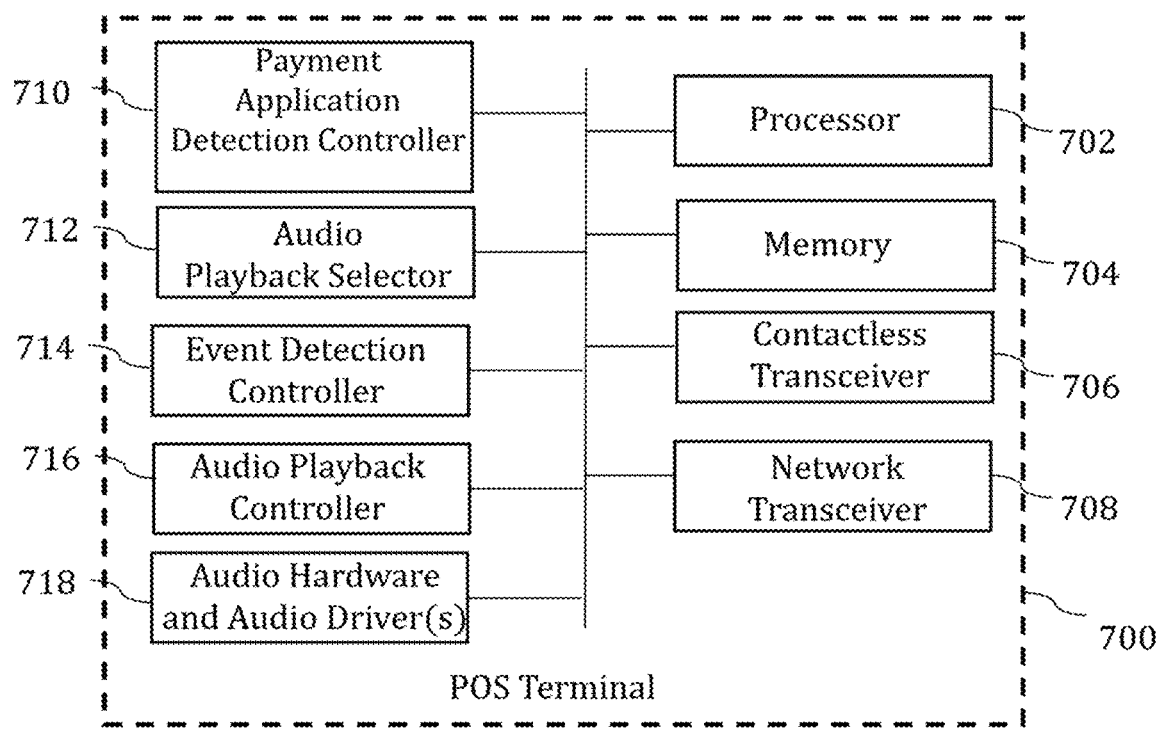
FIG. 7 illustrates internal components within an exemplary POS terminal which may be configured to implement the method steps of FIG. 6.

FIG. 7 illustrates internal components within a POS terminal 700 which has been configured to implement one or more steps of the method of FIG. 6.

As shown in FIG. 7, POS terminal 700 includes (i) a processor 702, (ii) a memory 704, (iii) a contactless transceiver 706 configured to send and receive data communications based on one or more contactless or contactless communication protocols (for example, a near field communication protocol or an RFID communication protocol), (iv) a network transceiver 708 configured to send and receive data communications over a data network (for example a TCP/IP network, the internet, or any other data network) to enable POS terminal 700 to communicate with any of a data network, a payment network, an acquirer network and/or an issuer network.

POS terminal 700 additionally includes a payment application detection controller 710 configured to detect a payment application stored within a payment card memory. In an embodiment, the payment application detection controller 710 may be configured to detect a payment application stored within a payment card memory in accordance with any of the embodiments of method step 604 described above.

POS terminal 700 further includes audio playback selector 712 configured to identify and select for playback, an audio file associated with a payment application detected by payment application detection controller 710. In an embodiment, the audio playback selector 712 may be configured to identify and select for playback, an audio file associated with a payment application detected by payment application detection controller 710 in accordance with any of the embodiments of method step 606 described above.

POS terminal 700 also includes event detection controller 714 configured to detect any of an interface event, a playback commencement event and/or a playback termination event, involving the POS terminal. In various embodiments, the event detection controller 714 may be configured to implement a part or the whole of any one or more embodiments of method steps 602 and/or 608 as described previously.

POS terminal 700 includes an audio playback controller 716 configured to effect playback of audio files through audio hardware integrated into or coupled with POS terminal 700. In an embodiment, audio playback controller 716 may be configured to implement the one or more of the audio playback steps described in more detail in connection with step 608 above.

POS terminal 700 also includes audio hardware and audio driver(s) 718 integrated therewithin or coupled thereto, which audio hardware and audio driver(s) enable POS terminal 700 to playback of audio files within an auditory playback range that is perceptible to payors/terminal operators at the POS terminal.

Figure 8:
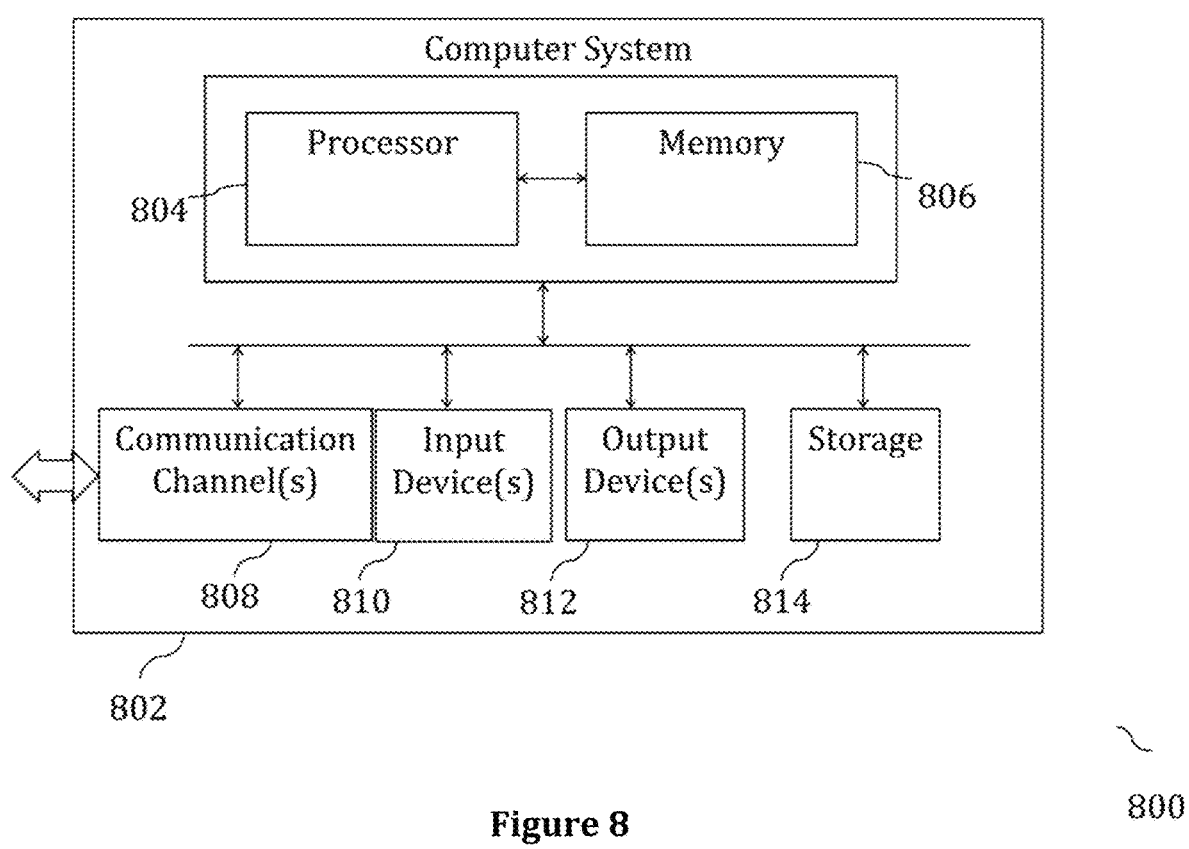
FIG. 8 illustrates an exemplary computer system according to which various embodiments of the present invention may be implemented.

FIG. 8 illustrates an exemplary computer system 800 according to which various embodiments of the present invention may be implemented.

System 800 includes computer system 802 which in turn comprises one or more processors 804 and at least one memory 806. Processor 804 is configured to execute program instructions—and may be a real processor or a virtual processor. It will be understood that computer system 802 does not suggest any limitation as to scope of use or functionality of described embodiments. The computer system 802 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 802 in accordance with the present invention may include one or more servers, desktops, laptops, tablets, smart phones, mobile phones, mobile communication devices, tablets and personal digital assistants. In an embodiment of the present invention, the memory 806 may store software for implementing various embodiments of the present invention. The computer system 802 may have additional components. For example, the computer system 802 may include one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various software executing in the computer system 802 using a processor 804 and manages different functionalities of the components of the computer system 802.

The communication channel(s) 808 allow communication over a communication medium to various other computing entities. The communication medium provides information such as program instructions, or other data in a communication media. The communication media includes, but is not limited to, wired or wireless or contactless methodologies implemented with an electrical, optical, RF, infrared, acoustic, microwave, Bluetooth or other transmission media.

The input device(s) 810 may include, but is not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 802.

The storage 814 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 may contain program instructions for implementing any of the described embodiments.

In an embodiment of the present invention, the computer system 802 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions that is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless or contactless techniques, including but not limited to microwave, infrared, Bluetooth or other transmission techniques. These instructions can be preloaded into a system or recorded on a storage medium such as a CD-ROM or made available for downloading over a network such as the Internet or a mobile telephone network. The series of computer readable instructions may embody all or part of the functionality previously described herein.

Based on the above, it would be understood that the present invention offers multiple advantages over the prior art including (i) providing auditory feedback concerning continuation of a payment transaction—and thereby eliminating the need for a payor/terminal operator to maintain a visual check on the POS terminal, (ii) permitting for playback of a brand theme song or an audio theme that specifically corresponds to a payment network or issuer institution or any other entity involved in the payment transaction—and thereby enabling utilization of the payment transaction duration to build or reinforce brand awareness corresponding to such entity, and/or (iii) optionally providing through an audio file, advertising information or other information, which enables delivery of valuable audio information to a payor during a payment transaction duration.

While exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A computer-implemented method for delivering feedback through a point-of-sale (POS) terminal during a payment transaction involving a payment card, the method comprising:
   detecting, by a processor, at the POS terminal, an interface event comprising the payment card communicatively interfacing with the POS terminal;
   based on the detecting of the interface event, selecting, by the processor, at the POS terminal, a payment application from a plurality of payment applications stored within a memory of the payment card;
   identifying, by the processor, an audio file corresponding to the selected payment application, the audio file comprising an audio composition associated with a payment network institution involved in processing the payment transaction, the audio file being stored outside the payment card and the POS terminal, and the audio file being accessed via a uniform resource locator stored within the payment card;
   providing, by the processor, a continuous auditory feedback to a user indicating that the payment transaction is continuing or stopped by playing the audio composition associated with the payment network institution through a playback device so long as the payment transaction continues; and
   stopping the playing of the audio composition when an outcome of payment transaction is received or the payment transaction is interrupted due to a failure of a communication channel between the POS terminal and a payment network of the payment network institution.

2. The method as claimed in claim 1, wherein the interface event is triggered by at least one of contacting a smartchip reader integrated within or coupled with the POS terminal, with a smartchip integrated within the payment card or proximity induced contactless communication between a contactless chip within the payment card and a contactless transceiver integrated within the POS terminal.

3. The method as claimed in claim 1, wherein the selected payment application stores at least one of a payment account number corresponding to the payment card, one or more security keys, a payment network identifier, or an issuer institution identifier, wherein the selected payment application comprises at least one of a software application, a software data file or a data record, and wherein the one or more security keys are associated with the payment card, a payment network or an issuer institution.

4. The method as claimed in claim 1, wherein selecting the payment application comprises at least one of extracting information from the payment application or identifying any of a payment account number, payment network, or a payment network institution, or an issuer network or issuer institution associated with the payment application.

5. The method as claimed in claim 1, wherein selecting the payment application from a plurality of payment applications comprises parsing data stored in a directory structure stored within the memory to select the payment application.

6. The method as claimed in claim 1, wherein the payment transaction continuance includes the POS terminal continuing to communicate with a server of a payment card issuer institution for a response to a transaction authorization request.

7. The method as claimed in claim 1, wherein the audio file is associated with a payment network institution or with an issuer institution corresponding to the payment application.

8. The method as claimed in claim 7, wherein the audio file comprises an audio theme, a song, musical composition, audio composition, or audio jingle associated with the payment network institution or the issuer institution.

9. The method as claimed in claim 1, wherein the continuous auditory feedback is provided to the user upon:
   identification or detection of the payment application by the POS terminal; or selection of the payment application from among the plurality of payment applications that are stored within the memory of the payment card, and each of which are recognized or supported by the POS terminal.

10. A point-of-sale (POS) terminal configured for delivering feedback during a payment transaction involving a payment card, comprising:
   at least one processor configured for:
      detecting at the POS terminal an interface event comprising the payment card communicatively interfacing with the POS terminal;
      based on the detecting of the interface event, selecting at the POS terminal, a payment application from a plurality of payment applications stored within a memory of the payment card;

identifying an audio file corresponding to the selected payment application, the audio file comprising an audio composition associated with a payment network institution involved in processing the payment transaction, the audio file being stored outside the payment card and the POS terminal, and the audio file being accessed via a uniform resource locator stored within the payment card; and providing a continuous auditory feedback to a user indicating that the payment transaction is continuing or stopped by playing the audio composition associated with the payment network institution through a playback device so long as the payment transaction continues; and stopping the playing of the audio composition when an outcome of payment transaction is received or the payment transaction is interrupted due to a failure of a communication channel between the POS terminal and a payment network of the payment network institutions.

11. The POS terminal as claimed in claim 10, configured such that the interface event is triggered by at least one of contacting a smartchip reader integrated within or coupled with the POS terminal, with a smartchip integrated within the payment card or proximity induced contactless communication between a contactless chip within the payment card and a contactless transceiver integrated within the POS terminal.

12. The POS terminal as claimed in claim 10, configured such that selecting the payment application comprises:
extracting information from the payment application; and
identifying at least one of a payment account number, payment network, or a payment network institution, or an issuer network or issuer institution associated with the payment application.

13. The POS terminal as claimed in claim 10, configured such that:
the payment card includes a plurality of payment applications stored within a memory therewithin; and
selecting the payment application comprises (i) detecting the plurality of payment applications stored within the memory, (ii) selecting one of the plurality of payment applications,
and (iii) extracting information from the selected payment application.

14. The POS terminal as claimed in claim 10, wherein the payment transaction continuance includes the POS terminal continuing to communicate with a server of a payment card issuer institution for a response to a transaction authorization request.

15. The POS terminal as claimed in claim 10, configured such that the audio file is associated with a payment network institution or with an issuer institution corresponding to the payment application.

16. The POS terminal as claimed in claim 15, configured such that the audio file comprises an audio theme, a song, musical composition, audio composition, or audio jingle associated with the payment network institution or the issuer institution.

17. The POS terminal as claimed in claim 10, configured such that the continuous auditory feedback is provided to the user upon:
identifying the payment application, by the POS terminal; or
selecting the payment application from among the plurality of payment applications that are stored within the memory of the payment card, wherein the plurality of payment applications is recognized by the POS terminal or supported by the POS terminal.

18. A computer program product for delivering feedback through a point-of-sale (POS) terminal during a payment transaction involving a payment card, comprising a non-transitory computer usable medium having a computer readable program code embodied therein, the computer readable program code comprising instructions for:
detecting, by a processor, at the POS terminal an interface event comprising the payment card communicatively interfacing with the POS terminal;
based on the detecting of the interface event, selecting, by the processor, at the POS terminal, a payment application from a plurality of payment applications stored within a memory of the payment card;
identifying, by the processor, an audio file corresponding to the selected payment application, the audio file comprising an audio composition associated with a payment network institution involved in processing the payment transaction, the audio file being stored outside the payment card and the POS terminal, and the audio file being accessed via a uniform resource locator stored within the payment card;
providing, by the processor, a continuous auditory feedback to a user indicating that the payment transaction is continuing or stopped by playing the audio composition associated with the payment network institution through a playback device so long as the payment transaction continues; and
stopping the playing of the audio composition when an outcome of payment transaction is received or the payment transaction is interrupted due to a failure of a communication channel between the POS terminal and a payment network of the payment network institution.

* * * * *